Aug. 23, 1938.    C. C. BENNETT    2,127,950
STATIC AND DYNAMIC WHEEL BALANCE TESTER
Filed Oct. 5, 1936    3 Sheets-Sheet 2

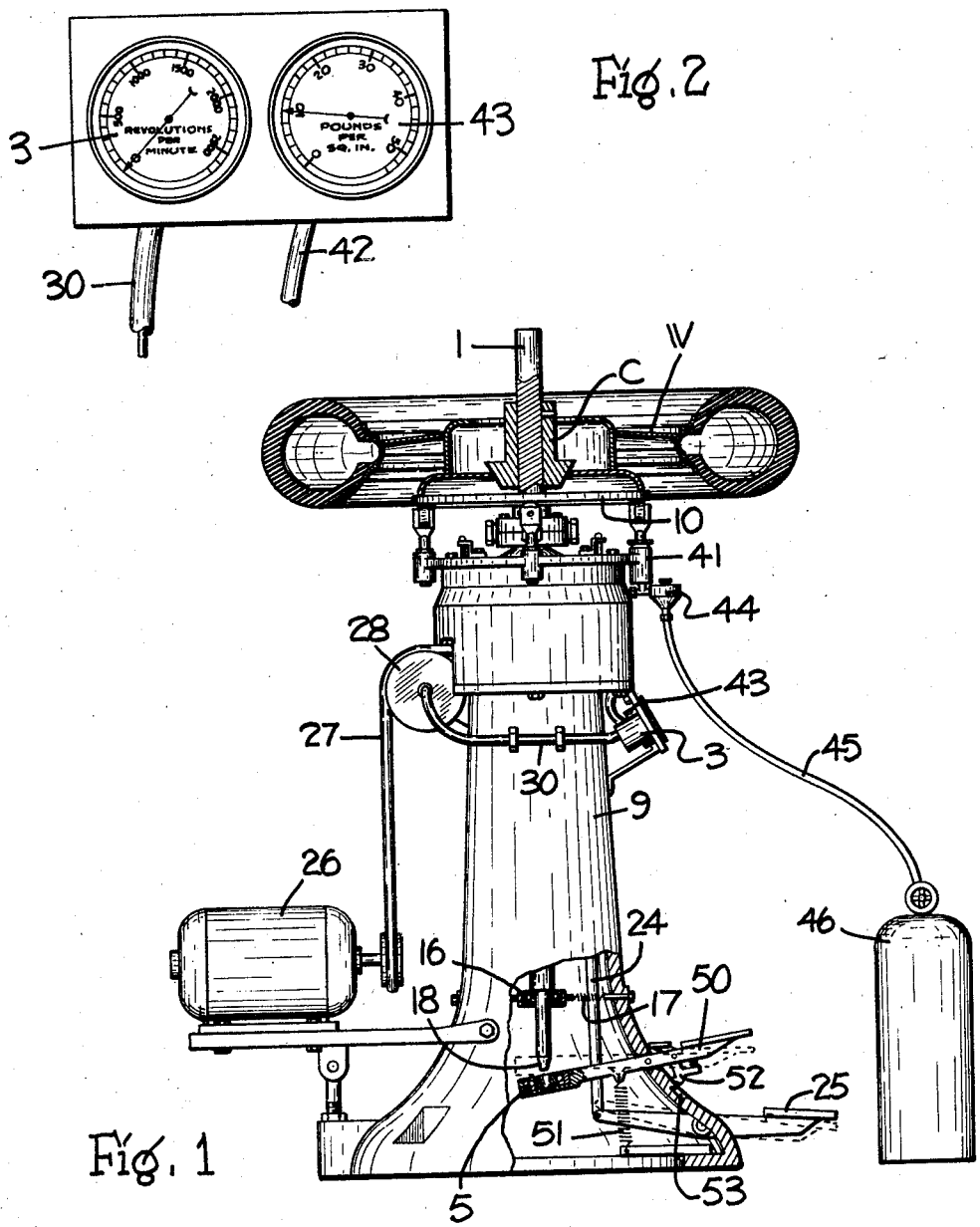

Inventor
Claude C. Bennett
By Charles L. Reynolds
Attorney

Aug. 23, 1938.  C. C. BENNETT  2,127,950
STATIC AND DYNAMIC WHEEL BALANCE TESTER
Filed Oct. 5, 1936  3 Sheets-Sheet 3
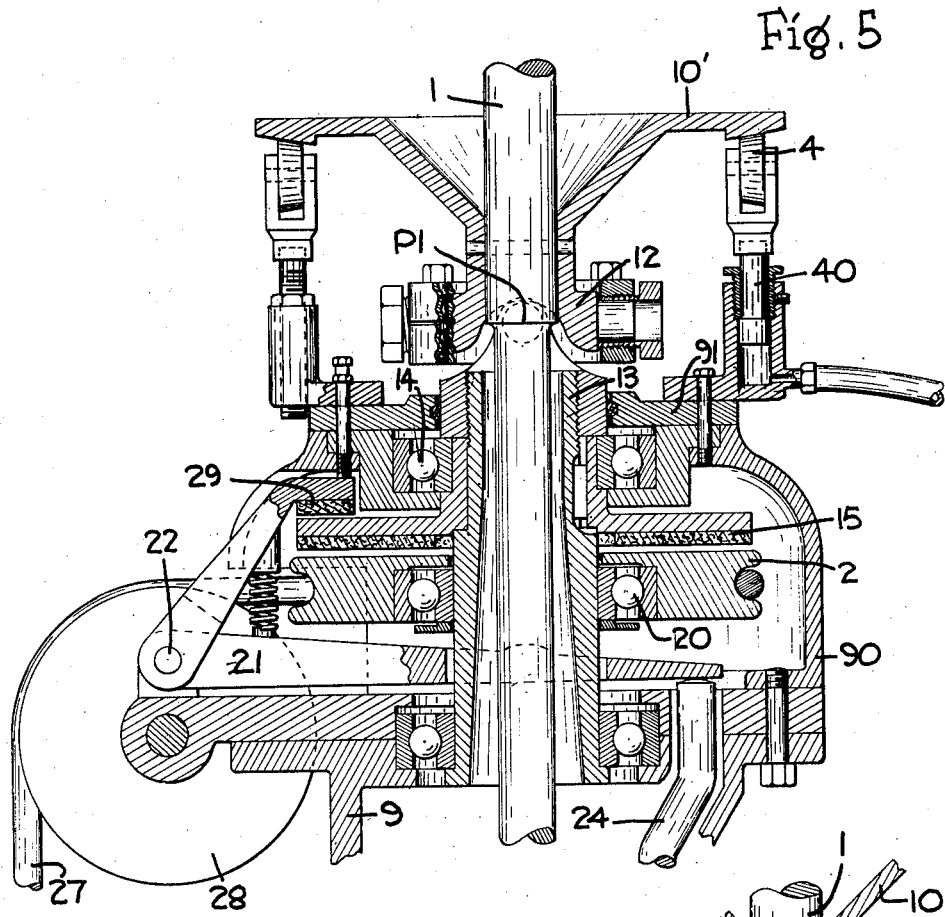
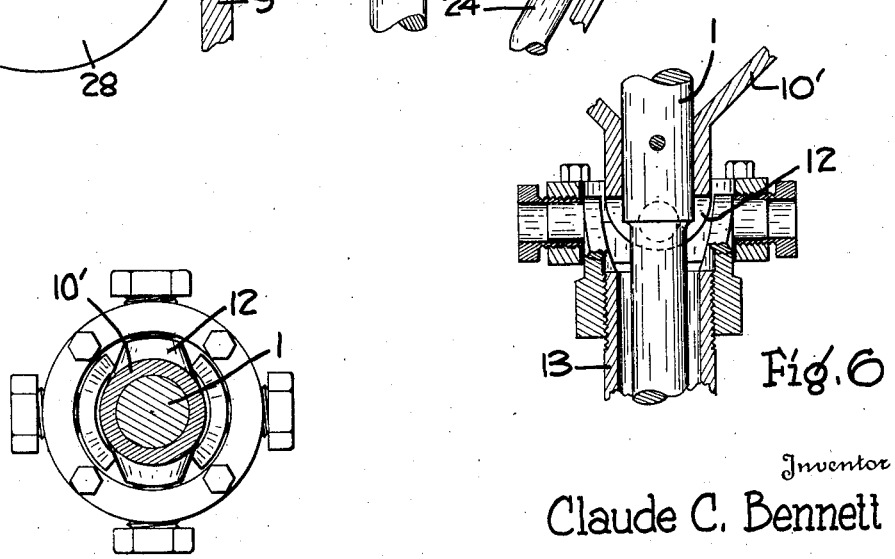
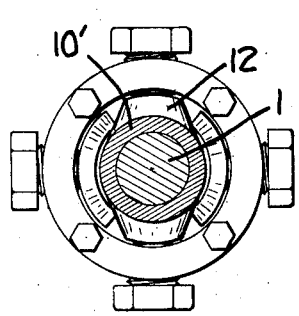
Inventor
Claude C. Bennett
By Charles L. Reynolds
Attorney Patented Aug. 23, 1938

2,127,950

UNITED STATES PATENT OFFICE 2,127,950

STATIC AND DYNAMIC WHEEL BALANCE TESTER

Claude C. Bennett, South Bend, Ind., assignor to A. E. Feragen, Inc., Seattle, Wash., a corporation of Washington Application October 5, 1936, Serial No. 104,045

13 Claims. (Cl. 73—51)

In the manufacture and assembly of automobiles, and in wheel alignment shops, it is desirable to ascertain quickly whether a given wheel (usually with a tire mounted thereon) is approximately in balance, statically and dynamically. Precise determinations of the amount and location of the point of unbalance are of secondary importance. If the wheel is badly out of balance it is discarded, hence it is not so essential to determine precisely the point of unbalance or the amount by which a wheel is out of balance, although if the indication of unbalance is not too great it may be possible to correct the unbalanced condition by simple expedients, so that it becomes desirable to ascertain, first, if the wheel is in balance, second, if not, if it is too far out of balance to be readily corrected.

Heretofore, so far as I am aware, the determination of the balance of wheels, such as automobile wheels, has been accomplished by two types of machines, one of which determines static balance only and the other of which determines dynamic balance only. In automobile manufacture and assembly determinations must be made with a minimum of time, hence it becomes desirable to employ a single machine for determination of both such factors, static and dynamic balance.

It is an object of the present invention, therefore, to provide one machine by means of which conditions of static or dynamic balance, or both, may be determined quickly and with sufficient accuracy for testing of wheels, and without change of position of the wheel.

It is a further object to provide a machine capable of testing wheels for dynamic balance at speeds approximating those at which the wheels will be turning on the road, so that a tendency to shimmy, for example, at a given speed may be simulated on the machine, and determination can be made quickly whether such a tendency to shimmy is due to unbalance in the wheel or to other factors in the steering system of the automobile.

It is a further object to provide a machine of the character indicated which is simple and convenient in operation, and rugged.

My invention comprises the novel machine as a whole, the novel parts thereof, and the novel combination and relative arrangement of such parts, as shown in the accompanying drawings, described in this specification, and as will be more particularly defined by the claims which terminate the same. My invention also is concerned with the novel method of determining static unbalance.

In the accompanying drawings I have shown my invention incorporated in forms such as are now preferred by me, it being understood that various changes in the character and form of the machine and its parts may be made, within the scope of the claims.

Figure 1 is an elevation of the complete machine, with a tire and wheel mounted thereon, parts being broken away and shown in section for better illustration.

Figure 2 is an elevation of indicators such as may be employed with such a machine.

Figure 5 is a section similar to Figure 3, showing a modified form of the invention.

Figure 6 is a section similar to Figure 4 of the form shown in Figure 5, and Figure 7 is a transverse section taken immediately above the universal joint.

Figure 3:
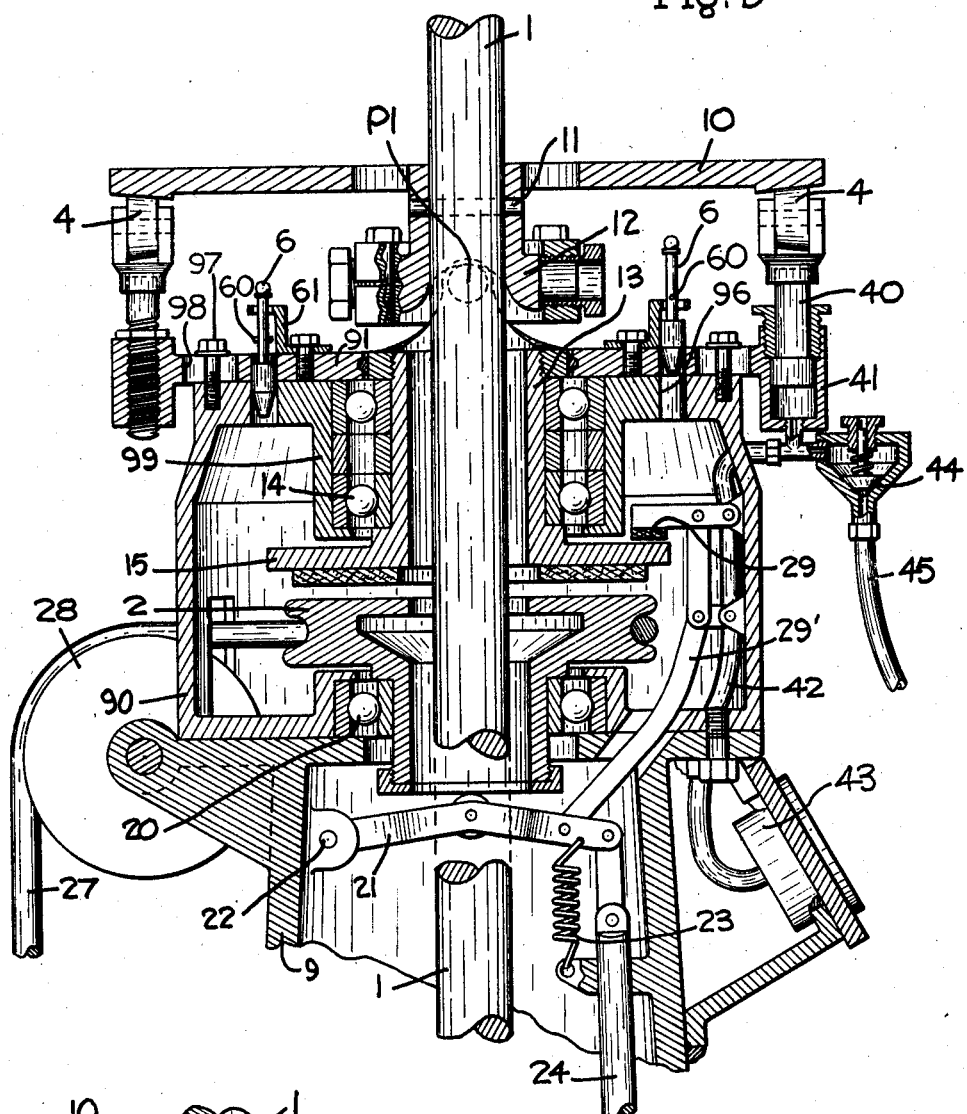
Figure 3 is an axial section through the upper part of the machine.
Figure 4:
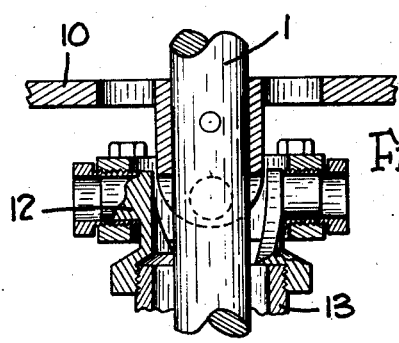
Figure 4 is an axial section taken at right angles to the plane of Figure 3, through the universal joint and associated elements.

In testing the wheel it is carried upon a wheel support, consisting of a horizontal table 10 and an upright spindle 1. These two elements are fixed together, as by the pin 11, and preferably the spindle extends downwardly to a considerable distance below the level of the table 10. Above the table the spindle is preferably unobstructed and comparatively short, to receive the wheel W, which is suitably held down upon the table and centered thereon by means such as the centering cone C.

For testing dynamic balance the wheel should be supported at a point close to its center of gravity, so that any weight which might be statically balanced but which is dynamically unbalanced will have a tendency to wobble the wheel, as it rotates, about its center of gravity, or about the point of support. To accomplish this end I may employ a universal joint, generally indicated by the numeral 12, and which may be of any suitable type of construction, one part of which is fixed to or formed as part of the table 10, and the other part of which is fixed to a rotative sleeve 13 surrounding the spindle 1, but not in contact therewith, for the spindle must be free to oscillate under the influence of a dynamically unbalanced wheel, about the point P1, which being the center of the universal joint 12 lies in the wheel's axis of rotation.

The sleeve 13 is supported by radial and thrust bearings 14 supported from a top plate 91, which in effect, during dynamic balance testing, is a part of a stand 9 and a head 90 secured on the upper end thereof. The plate 91, during dynamic balancing tests, is fixed to the head 90, which in turn is fixed to the stand 9.

Formed on the sleeve 13 is a clutch element 15, by means of which the spindle 1 and the table 10, constituting the wheel support, may be rotated. A complemental clutch element 2 may be formed as a pulley, supported in a radial and thrust bearing 20 carried in the stand, so that the pulley may be rotated and moved axially into and from engagement with the complemental clutch element 15. Such movement may be accomplished in any convenient manner, as for example by a yoke 21 pivoted in the stand 9 at 22, and normally held down by a spring 23, but movable upwardly by a rod 24 controlled by a foot pedal 25. The pulley 2 may be rotated by suitable power means, as for example by the motor 26 connected to the pulley by a belt 27 extending over the idler 28. A brake member 29 may be connected to the foot pedal 25, as by the links 29', so that by movement of the foot pedal in a direction opposite to that for effecting engagement of the driving clutch element 2 with the driven element 15 the brake 29 may be brought into engagement with the clutch element 15 to slow down or stop rotation of the spindle.

The arrangement illustrated in Figure 5 is in all such respects similar to that shown in Figure 3, except that, since it is intended for dynamic balance testing only, the top plate 91 is at all times fixed upon the top of the head 90, and the sleeve 13, since it is never required to move laterally, is journaled directly in the stand 9 and top plate 91. The brake 29 is fixed in position above the clutch element 15, and is engaged by continued upward movement of the latter until it engages with the brake, this being accomplished by upward movement of the yoke 21 and clutch element 2, the motor 26 having been stopped at such time. Also in Figure 5 the table 10' is shown somewhat coned, so that the wheel is elevated somewhat more above the point P1. The reverse might be the case, however, and when the structure of the wheel permits the center of the universal joint might be made to coincide closely with the wheel's center of gravity.

With the wheel W in place, as shown in Figure 1, it may be tested for dynamic unbalance by rotating it through engagement of the driving clutch element 2 with the driven clutch element 15. Its speed of rotation may be as high as desired or necessary for the test, within the limits of the motor and drive means, and since it is sometimes desirable to test the wheel at some given speed, an indicator or tachometer 3 is provided, connected to the drive at a suitable point, as for example to the shaft of the idler 28, through means such as the flexible shaft 30. This may be calibrated in revolutions per minute, or, if preferred, at road speeds for wheels of various diameter.

Should the wheel be dynamically out of balance, it will tend to depart from a plane normal to its axis of rotation, and will tend to wobble about its center of gravity. The point P1 being located adjacent the center of gravity, the wheel will tend to wobble about this point P1, and the lower end of the spindle 1 will wobble. Preferably means are provided to restrain this movement of the lower end of the spindle, as for example a bearing member 16 surrounding the lower end of the shaft within the stand 9, and springs 17 engaging the bearing 16, and restraining the whipping movement of the spindle.

I prefer also to provide additional means for restraining the oscillation of the spindle under the influence of a dynamically unbalanced wheel, and which will permit oscillation in only one direction, so that that oscillation, though it may be slight, may readily be indicated. To this end I provide rollers 4 engaging beneath the under side of the table 10, and adjustably supported in the top plate 91, so that they can be accurately adjusted to maintain the table 10 normally in a horizontal plane when the spindle 1 is exactly vertical. One of these rollers, however, is supported upon the upper end of a plunger 40, received within a cylinder 41 supported upon the top plate 91, and connected through a flexible hose 42 or similar member to a pressure gauge 43, which may be located alongside the tachometer 3. Pressure may be maintained or regulated in this system in any suitable manner as by connecting the system past a pressure reducing valve 44 in the conduit 45 with a source of pressure represented by the pressure cylinder 46. By these or any equivalent means the pressure in the indicating system may be maintained constant, and as the wheel W rotates, usually at high speed, any tendency to oscillation will be reflected by downward pressure on the plunger 40, and by movement of the indicator of the gauge 43. The latter may be suitably calibrated, though it is not intended as a precise indicator of the amount of weight required to correct the unbalanced condition. Rather it is an indicator of the fact that there is dynamic unbalance, and approximately the extent of such unbalance, so that it may be determined if the wheel may be more accurately tested and corrected, or must be discarded and scrapped.

In order to test static unbalance somewhat the same principles may be employed. Static unbalance, however, is a condition which is usually tested with a wheel in a vertical position, whereupon the unbalanced weight will tend to seek the lowest spot. I discover static unbalance, however, by rotating the wheel at a good speed, so that the unbalanced weight will produce a centrifugal force tending to produce oscillation, meanwhile supporting the wheel for oscillation about a point distant from its center of gravity, but lying in its axis of rotation.

Such a point of support may be formed by the bearing 5, which is provided with a cone-shaped socket to receive the coned lower end 18 of the spindle 1. The bearing 5 is supported for movement from a normal position, where it is out of engagement with the spindle, leaving the latter free to oscillate, into a position shown in dotted lines in Figure 1, wherein it engages the spindle and holds its lower end precisely in place, so that the coned end 18, at a point distant from the center of gravity of the wheel, forms a point about which the wheel and its support tend to oscillate under the influence of the centrifugal force generated by rotation of an unbalanced weight on the wheel.

The bearing 5 may be supported upon a foot lever 50, mounted in the stand and normally held in such a position that the bearing does not engage the spindle by means of a spring 51. A locking dog 52 on the lever 50, engageable within a notch 53 in the stand, serves to hold parts in the engaged position when the wheel support is thus engaged by the bearing 5. In order that it may be permitted to move laterally under the influence of the centrifugal force mentioned, the top plate 91 must be released from the stand 9 or its head 90, and I have shown locking pins 6 supported upon the plate 91 and receivable tightly in the annular space 96 between the head 90 and the bearing support 99 to maintain the top plate and stand immovable with relation to one another during dynamic balance testing, as previously described. However, the pins 6 may be raised out of the space 96 and held in position clear of this space, as for example by cross pins 60 passing through slots in a bracket 61 and resting upon the top of this bracket by rotation of the pins. The plate 91 is held to the head 90 at all times by bolts and cross straps 97, but these bolts, being received in holes 98 in the top plate 91, permit the plate to move laterally. The holes 98 may be mere slots of a width of the bolts 97, permitting the plate 91 to move in one direction only, or they may be larger than the bolt in all directions, and the plate may move in all directions transversely of the axis of rotation.

Such movement of the wheel support and top plate 91 will in itself indicate static unbalance when the wheel is rotating at a speed to develop centrifugal force of appreciable amount. However, the plunger 40 will under such circumstances be depressed and the plate 10 will have a vertical component of oscillation which will be reflected in movement of the plunger 40, and the indicator 43 will also show such a condition, and will indicate approximately the extent of unbalance.

It will be understood that the wheel support is set in rotation by engagement of the driving clutch member 2 with the driven clutch member 15, and that the clutch elements are disengaged when the parts have attained a sufficient rate of speed preparatory to the testing. Such tests, however, are rapidly made, and the test for static balance and for dynamic balance can both be accomplished in succession without change of position of the wheel, and in a very short space of time.

What I claim as my invention is:

1. In a wheel balance tester, in combination, an upright spindle and a normally horizontal wheel supporting table fixed thereto constituting a wheel support, means mounting said wheel support for rotation and oscillation normally about a point in the wheel's axis adjacent its center of gravity, to indicate dynamic unbalance, and selective means for restraining oscillative movement of the spindle at a point remote from said table to cause oscillation of said spindle about a point in the wheel's axis distant from its center of gravity, to indicate static unbalance.

2. In a wheel balance tester, in combination, an upright spindle and a normally horizontal wheel supporting table fixed thereto constituting a wheel support, means mounting said wheel support for rotation and oscillation normally about a point in the wheel's axis adjacent its center of gravity, to indicate dynamic unbalance, selective means for restraining oscillative movement of the spindle at a point remote from said table to cause oscillation of said spindle about a point in the wheel's axis distant from its center of gravity, to indicate static unbalance, and means to rotate said wheel support.

3. In a wheel balance tester, in combination, an upright spindle and a normally horizontal wheel supporting table fixed thereto constituting a wheel support, means mounting said wheel support for rotation and oscillation normally about a point in the wheel's axis adjacent its center of gravity, leaving the spindle otherwise free to oscillate, to indicate dynamic unbalance, selective means for restraining oscillative movement of the spindle at a point remote from said table to cause oscillation of said spindle about a point in the wheel's axis well below its center of gravity, to indicate static unbalance, means to fix said first means during dynamic testing, and releasable to permit its movement with the spindle during static testing, and means to rotate said spindle.

4. In a wheel balance tester, in combination, an upright spindle and a normally horizontal wheel supporting table fixed thereto constituting a wheel support, a clutch element operatively connected thereto to rotate the same, a complemental clutch element engageable with the first clutch element, and means to drive the complemental clutch element, means mounting said wheel support for rotation and oscillation about a point in the wheel's axis well below its center of gravity, with a wheel in place, leaving its upper end free to oscillate, to indicate static unbalance, means to fix the upper end, at will, against oscillation, means to render the first-mentioned supporting means inoperative, at will, and means to mount the wheel support for rotation and oscillation about a point in the wheel's axis adjacent its center of gravity, with a wheel in place, leaving its lower end free to oscillate, to indicate dynamic unbalance.

5. In a wheel balance tester, in combination, a downwardly dependent spindle and a normally horizontal wheel supporting table fixed thereto constituting a wheel support, means to rotate said wheel support, means including a transverse plate, a rotative bearing carried thereby and a universal joint mounting said wheel support for rotation and oscillation about a point in the wheel's axis adjacent its center of gravity, leaving the spindle's lower end to oscillate under the influence of a dynamically unbalanced wheel, bearing means engageable with the lower end of the spindle to secure it against oscillation, quickly releasable means to fix said transverse plate against oscillation, and when released permitting oscillation of the wheel support, while rotating, about the last-mentioned bearing means, under the influence of a statically unbalanced wheel.

6. In a wheel balance tester, means to support a wheel in a normally horizontal plane, means to rotate the support and wheel, and two means to support the wheel support during rotation, for oscillation alternatively about either one of two centers lying in the wheel's axis, one disposed adjacent the wheel's center of gravity, for oscillation under the influence of a dynamically unbalanced wheel, the other disposed distant from the wheel's center of gravity, for oscillation under the influence of a statically unbalanced wheel.

7. In a wheel balance tester, in combination, a downwardly dependent spindle and a normally horizontal wheel supporting table fixed thereto constituting a wheel support, means mounting said wheel support for rotation and oscillation normally about a point in the wheel's axis adjacent its center of gravity, means to rotate the wheel support, means engaging the table from below to restrain the wheel support against oscillation under the influence of a dynamically unbalanced wheel, except in one direction, and means to indicate such oscillation.

8. In a wheel balance tester, in combination, a downwardly dependent spindle and a normally horizontal wheel supporting table fixed thereto constituting a wheel support, means mounting said wheel support for rotation and oscillation normally about a point in the wheel's axis adjacent its center of gravity, means to rotate the wheel support, means engaging the table from below to restrain the wheel support against oscillation under the influence of a dynamically unbalanced wheel, except in one direction, a member engageable with the table from below and movable thereby as the table oscillates, and an indicator operable by movement of said member to indicate such oscillation.

9. In a wheel balance tester, in combination, a downwardly dependent spindle and a normally horizontal wheel supporting table fixed thereto constituting a wheel support, means mounting said wheel support for rotation and oscillation normally about a point in the wheel's axis adjacent its center of gravity, means to rotate the wheel support, means engaging the table from below to restrain the wheel support against oscillation under the influence of a dynamically unbalanced wheel, except in one direction, means to indicate such oscillation, and means to indicate the speed of rotation of the wheel support.

10. In a wheel balance tester, in combination, a horizontal wheel supporting table and a downwardly dependent spindle fixed thereto constituting a wheel support, means to rotate said wheel support, a bearing engageable with the spindle well below the wheel's center of gravity, leaving its upper end to oscillate under the influence of a statically unbalanced wheel, means restraining the table from tilting except in one direction, and indicating means operatively engaged with the wheel support to indicate tilting in this direction.

11. In a wheel balance tester, in combination, a stand, a driven clutch element guided in the upper portion of said stand for rotation, a complemental driving clutch element likewise guided in said stand for movement into and from driving engagement with the driven clutch element, a universal joint supported from the driven clutch element for rotation therewith, a horizontal wheel supporting table and a downwardly dependent spindle constituting a wheel support, and supported on said universal joint for rotation therewith, whereby the lower end of the spindle may oscillate under the influence of a dynamically unbalanced wheel on said table, spring means engaging the lower end of the spindle to restrain its oscillation, and means to indicate oscillation of the wheel support.

12. In a wheel balance tester, in combination, a stand, a driven clutch element guided in the upper portion of said stand for rotation, a complemental driving clutch element likewise guided in said stand for movement into and from driving engagement with the driven clutch element, a universal joint supported from the driven clutch element for rotation therewith, a horizontal wheel supporting table and a downwardly dependent spindle constituting a wheel support, and supported on said universal joint for rotation therewith, whereby the lower end of the spindle may oscillate under the influence of a dynamically unbalanced wheel on said table, means constraining the table to rotation in a horizontal plane, but permitting it to tilt in a single direction, and means to indicate such tilting.

13. In a wheel balance tester, in combination, a stand, a plate supported in the upper portion of said stand, quickly releasable means to fix said plate to the stand or to release it for transverse movement, a driven clutch element guided in said plate for rotation, a complemental driving clutch element guided in said stand for movement into and from driving engagement with the driven clutch element, a wheel supporting table and a downwardly dependent spindle constituting a wheel support and fixed to the driven clutch element for rotation therewith, and a bearing member engageable with the lower end of the spindle, whereby the wheel support may oscillate under the influence of a statically unbalanced wheel.

CLAUDE C. BENNETT.